No. 747,098. PATENTED DEC. 15, 1903.
A. W. STANLEY.
SCALE.
APPLICATION FILED MAR. 18, 1903. RENEWED NOV. 12, 1903.
NO MODEL.
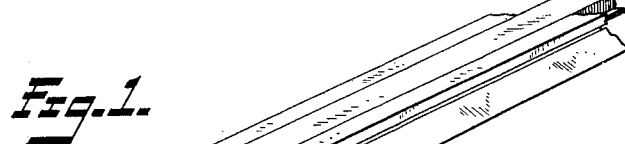
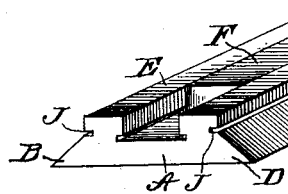
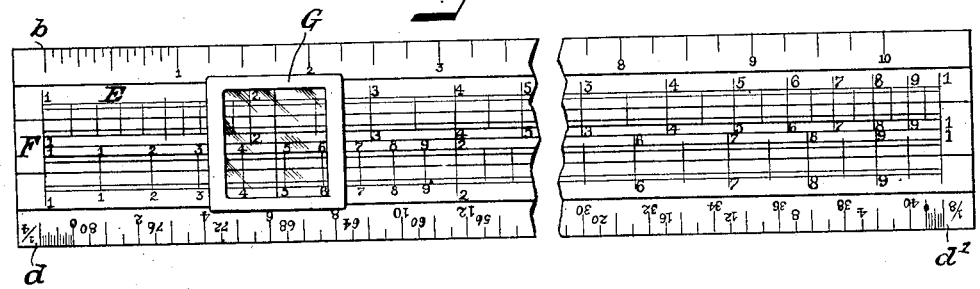
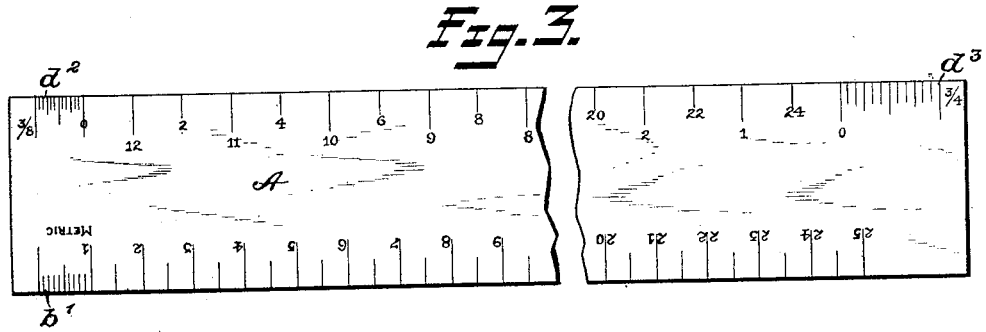
WITNESSES: Geo. V. Rasmussen
INVENTOR
Alix W. Stanley
BY
R. Cunneehee
ATTORNEY.

No. 747,098. Patented December 15, 1903.

UNITED STATES PATENT OFFICE.

ALIX W. STANLEY, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

SCALE.

SPECIFICATION forming part of Letters Patent No. 747,098, dated December 15, 1903.

Application filed March 18, 1903. Renewed November 12, 1903. Serial No. 180,960. (No model.)

*To all whom it may concern:*

Be it known that I, ALIX W. STANLEY, a citizen of the United States, residing at New Britain, Hartford county, State of Connecticut, have invented certain new and useful Improvements in Scales, of which the following is a full, clear, and exact description.

My invention relates to scales, and particularly to the construction of the same.

It is the purpose of my invention to provide a simple and compact instrument which may be used to facilitate measurement and calculation.

In the drawings, Figure 1 is a perspective view of one end of a scale embodying my invention. In this view the graduations are not illustrated. Fig. 2 is a plan view thereof, an intermediate portion being broken away. In this view graduations are shown. Fig. 3 is a view of the under side of the structure shown in Fig. 2. Fig. 4 is a perspective view of a detail of construction.

A is a double-flanged base, the opposite edges B D of which are beveled.

E is a superstructure having a longitudinal groove or passage fitted with a slide F. Upon the edges of the slide F and the adjacent edges of the superstructure (see Fig. 2) are graduations. These graduations are such as are employed on a logarithmic slide-rule, and inasmuch as the arrangement and function of the same are well known a detailed description herein is unnecessary.

G is a rider having a transparent window therein, across which may extend a fine line to facilitate a reading of the slide-rule. Flanges H H on the rider G take into undercut grooves J J in the sides of the superstructure E. By this means the rider may be moved longitudinally on the rule to any desired position, but is prevented from becoming accidentally detached. The top surface of each edge of a double-flanged base is provided with graduations—for example, as seen in Fig. 2. The lower surface of the base A is also graduated at each edge. (See Fig. 3.) These graduations on the upper and lower edges of the body A represent different scales. For instance, $b$ may represent a scale graduated in inches. On the same edge, but on the opposite surface, $b'$ may represent a metric scale. These are so graduated that the figures from "1" up both start from the same end of the scale, and therefore equivalents in the two scales may be easily read one from the other.

$d$ may represent a drafting-scale of one-fourth of an inch to the foot. $d'$ may represent a drafting-scale of one-eighth of an inch to the foot. $d^2$ may represent a drafting-scale of three-eighths of an inch to the foot, and $d^3$ may represent a drafting-scale of three-fourths of an inch to the foot.

By making the double-flanged base substantially broader than the superstructure the rider in none of its positions will hide the graduations on the base. The construction as a whole will be found to be economical, simple, and compact, and the user will find himself always equipped with means for plotting to any desired scale and for making any slide-rule computation.

What I claim is—

In an instrument of the character described, a double-flanged base, the opposite edges of which are beveled, graduations thereon, a superstructure of less width, a rider mounted to slide longitudinally on said superstructure, and a slide mounted on said superstructure and adapted to slide longitudinally thereof, and graduations on said superstructure and on said slide.

ALIX W. STANLEY.

Witnesses:
ROBT. S. ALLYN,
L. VREELAND.